United States Patent [19]
Garland

[11] Patent Number: 5,743,570
[45] Date of Patent: Apr. 28, 1998

[54] UNIVERSAL COUPLING FOR BATH ACCESSORY

[76] Inventor: Thomas A. Garland, 76 Reservoir Cr., Jamestown, R.I. 02835

[21] Appl. No.: 812,519

[22] Filed: Mar. 7, 1997

[51] Int. Cl.[6] ........................................... F16L 21/03
[52] U.S. Cl. .......................... 285/8; 285/148.22; 285/379
[58] Field of Search ............................... 285/8, 345, 379, 285/148.22

[56] References Cited

U.S. PATENT DOCUMENTS

| | | | |
|---|---|---|---|
| 1,473,537 | 11/1923 | Bailey | 285/8 |
| 2,094,889 | 10/1937 | Hooper | 285/8 |
| 2,688,499 | 9/1954 | Hanson | 285/8 |
| 3,148,895 | 9/1964 | Jasper et al. | 285/8 X |
| 3,844,586 | 10/1974 | Olen | 285/8 |
| 4,231,400 | 11/1980 | Friedling | 285/8 |
| 5,194,156 | 3/1993 | Tomchak | 285/8 X |

*Primary Examiner*—Dave W. Arola
*Attorney, Agent, or Firm*—Salter & Michaelson

[57] ABSTRACT

The coupling of this invention consists of a flexible plastic housing having a body and downward extending spout. An annular sealing element is constructed from a rubber or plastic foam material, said element having a central opening which fits over the faucet and forms a friction engagement with the outer surface thereof. The body of the housing fits over the annular seal and engages the sealing element in a friction fit.

8 Claims, 4 Drawing Sheets

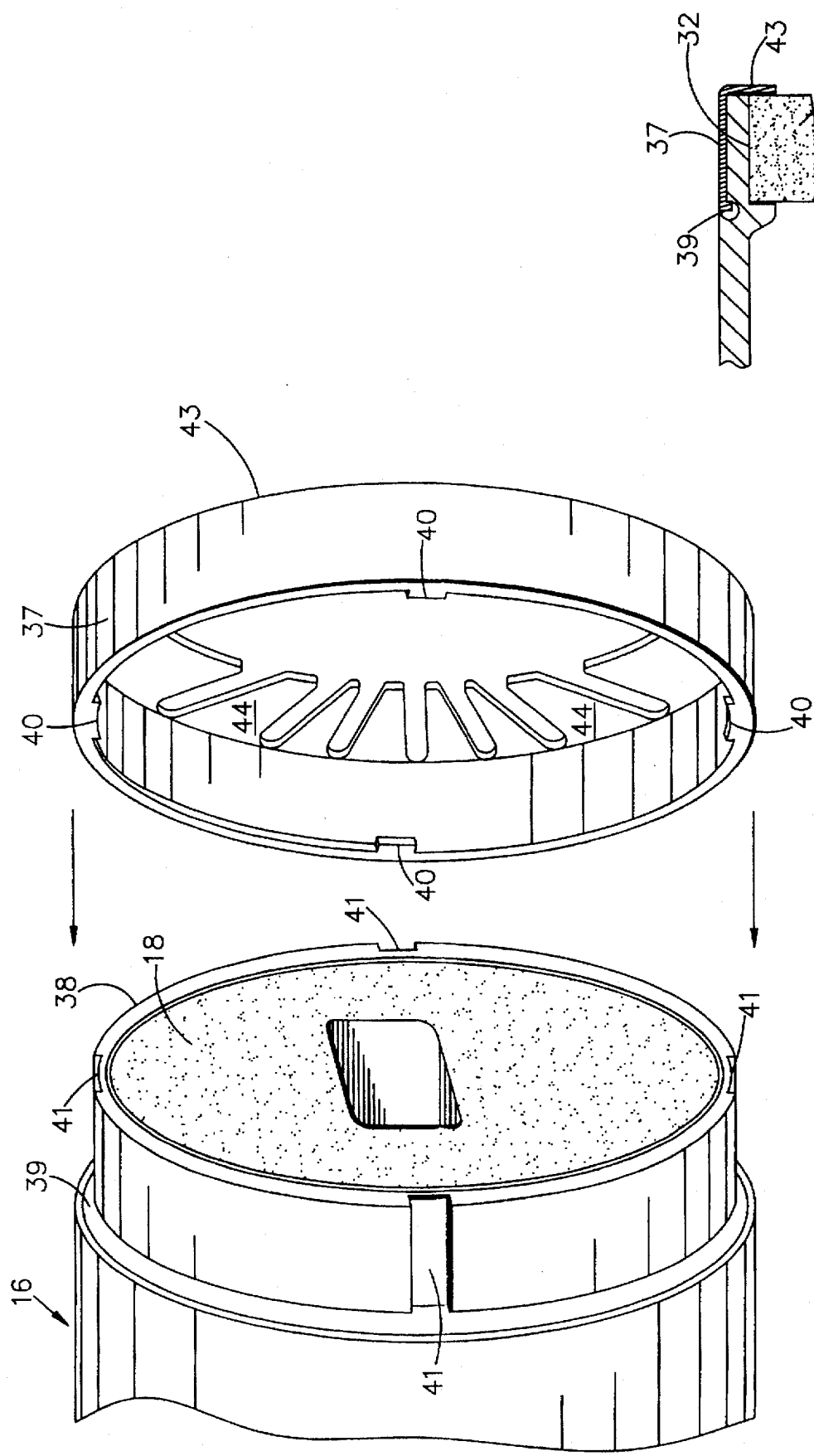

UNIVERSAL COUPLING FOR BATH ACCESSORY

BACKGROUND OF THE INVENTION

It has long been desired to attach bath accessories such as toys and shower sprays to the faucet of a bath or sink. This requires a flexible coupling to which is attached a hose or tube connected to the accessory. In general the prior art has attempted to accomplish this purpose by the use of flexible coupling which is designed to fit over the faucet. This coupling is generally conical in shape to accommodate the wide variety of existing faucet shapes. The external shape of the faucet creates problems in obtaining a secure fit between the outer faucet housing and the inner surface of the coupling. The prior art couplings tend to slip off, leak, or pop off under the pressure of the water.

One example of a prior art coupling is shown in FIG. 1a, b, and c. A truncated conically shaped flexible plastic housing 1 is constructed to connect to the hose 2 of a toy 3 at its truncated end 4. The base 5 of the coupling has a radially inward extending flexible diaphragm 6 with a circular opening 7. The diaphragm 6 engages the outer surface 8 of the faucet 9 to hold it in place and seal the coupling to the faucet 9. Generally further securing means are needed and flexible straps 10 are provided with suctions cups 11 for attachment to the sides 12 of faucet 9. If further sealing structure is needed a hard rubber O-ring 20 is fitted over the faucet to engage the inner periphery of the inner edge of the diaphragm 6. One of the primary difficulties of this type of coupling is that it does not accommodate the normal downward bend of the spout of the faucet and the full force of the water exiting the spout is directed at the side of the coupling. In addition no reliable seal is created and leaking will occur. Pressure in the coupling will build and blow the coupling off providing an unexpected shower for the user.

It is the purpose of this invention to provide a flexible coupling assembly which may be securely attached to a faucet and reliably connect the faucet to a bath accessory without leaking or blowing off.

SUMMARY OF THE INVENTION

The coupling of this invention consists of a flexible plastic housing having a body and downward extending spout. An annular sealing element is constructed from a rubber, plastic, foam RUBBER, or ELASTIC material, said element having a central opening which fits over the faucet and forms a friction engagement with the outer surface thereof. The body of the housing fits over the annular seal and engages the sealing element in a friction fit. A containment collar is constructed to fit over the faucet and engage the upstream end of the housing body to provide additional structure in the area of the seal and to contain the seal element within the body. The collar also insures a secure fit between the sealing element and the body of the housing.

DESCRIPTION OF THE DRAWING

The preferred embodiment of the invention is described in more detail below with reference to the drawing and in said drawing:

FIG. 7 is a perspective view of a containment collar and the upstream end of the coupling of this invention; and FIG. 8 is a sectional view of a segment of the collar and body of the coupling of this invention.

DETAILED DESCRIPTION OF THE PREFERRED EMBODIMENT

Figure 1A:
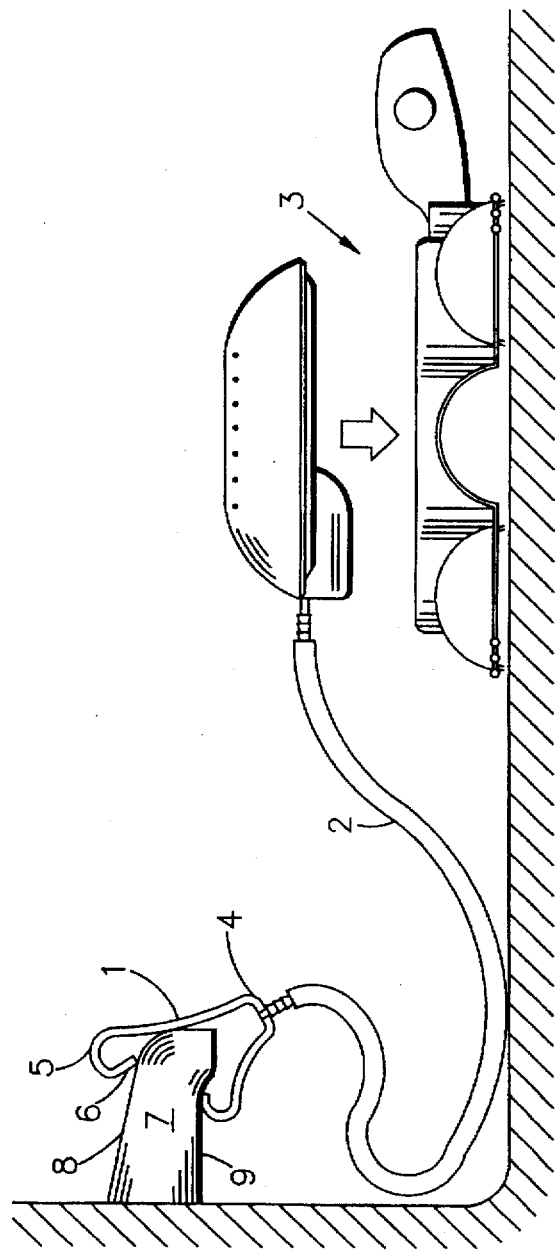
FIGS. 1 a, b, and c show a coupling of the prior art.
Figure 1C:
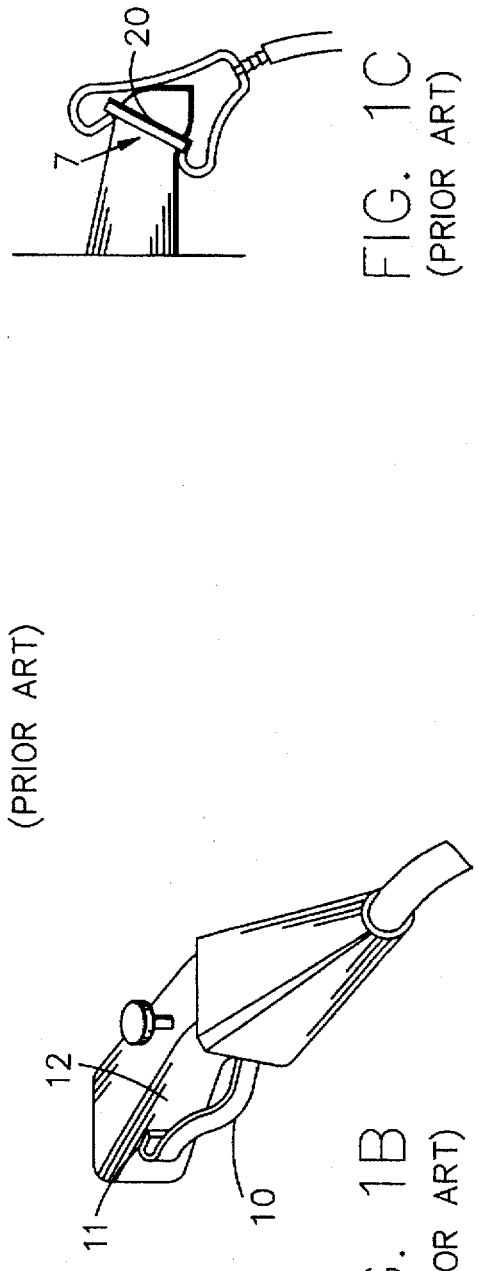
Figure 1B:
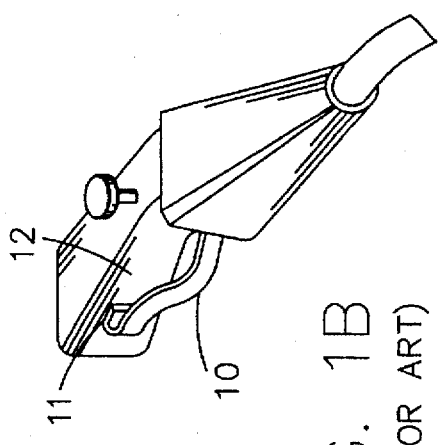
Figure 2:
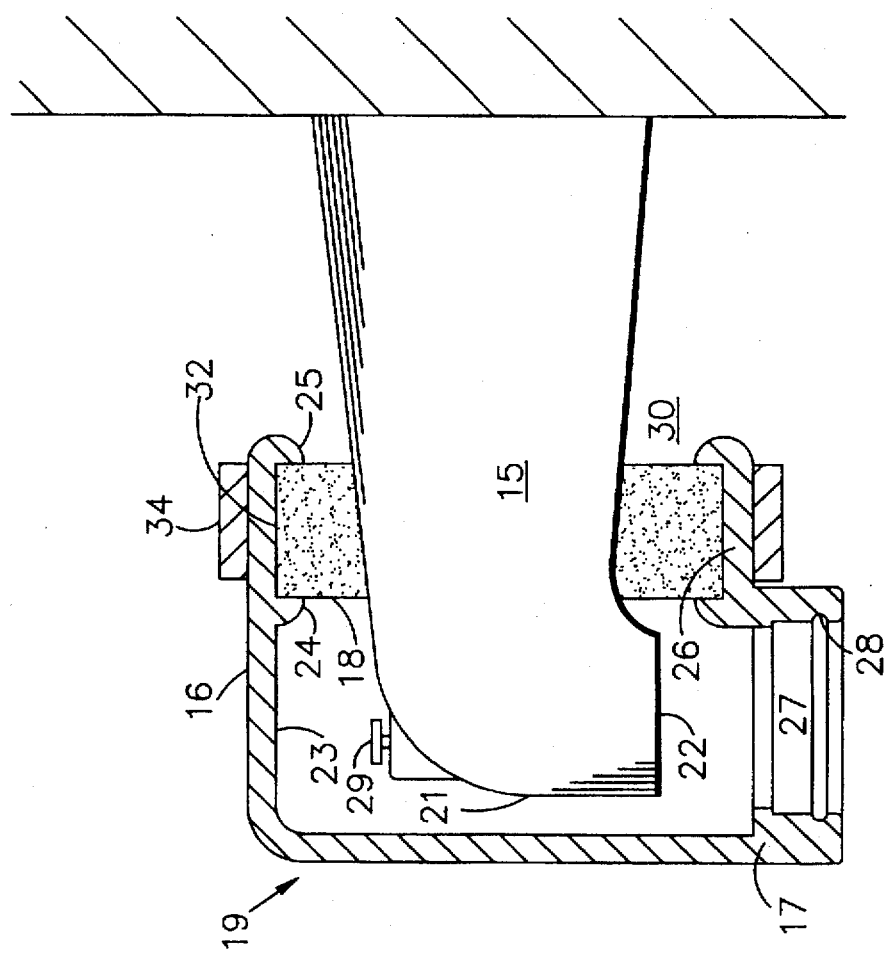
FIG. 2 is a partial sectional side view of the coupling of this invention.

It is the purpose of this invention to provide a mechanism for connecting the hose 2 of a bath or sink accessory 3 as shown in FIG. 1a to a faucet 9, which map take a variety of shapes. As best shown in FIG. 2, the coupling 19 of this invention is constructed of body or housing 16, a spout 17, and a sealing element 18.

The faucet 15 consists of a downward extending spout 21 ending in an outlet 22 from which water under pressure exits when the valve (not shown) of the faucet 15 is opened. The outer size and shape of faucets vary considerably but in general have a cross sectional profile within the range of between ⅞ inches to 1 and ½ inches in diameter or across a diagonal. In some instances there may be an obstruction such as a shower valve stem 29 as shown in FIG. 2.

Figure 3:
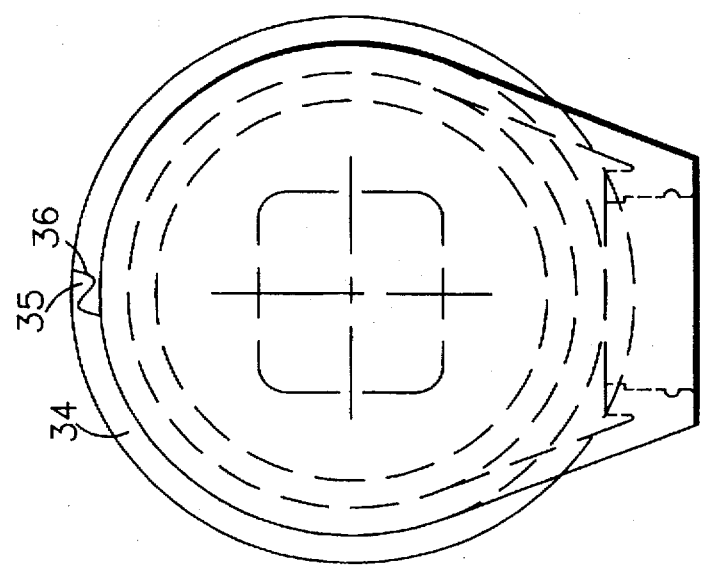
FIG. 3 is a front view of the coupling shown in FIG. 2.
Figure 6:
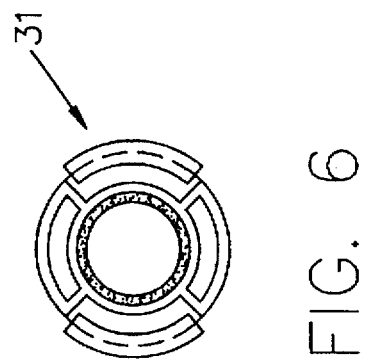
FIG. 6 is a bottom view of the connector shown in FIG. 4.
Figure 4:
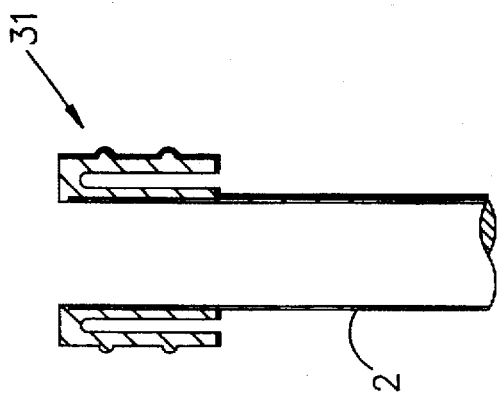
FIG. 4 is a sectional view of the a hose connector which may be used with the coupling of this invention.

The body 16 of the coupling 19 is an enlarged, somewhat bulbous element which is designed to fit over the faucet 15. As shown in FIG. 3, it is preferable that body 16 have a circular cross section to facilitate shape retention under internal loading. The body 16 is molded from a thermoplastic or rubberized material which is sufficiently flexible to distort during installation over the faucet 15. Body 16 is constructed with an upstream opening 30 sized to receive the sealing element 18 and maintain it under compression. On the inner surface 23 of body 16, near the opening 30, there is constructed a pair of annular ridges 24 and 25 between which is formed an annular slot 26. The spout 17 of the coupling 19 is a continuation of the body 16 and constructed of the same material. The spout 17 ends in a downward opening exit 27 which is threaded or constructed with a slot 28 to receive a snap fitting 31 as shown in FIG. 4. The spout therefore, must be sufficiently rigid to receive the hose fitting 31 and reliably retain it in place under the pressure of the flowing water. The orientation of the spout 17 allows the water exiting the faucet 15 to be directed at exit 27 of the spout 17.

The sealing element 18 is generally annular having a central passage 32 sized to receive the smallest of the faucets 15 in a force fit. The element 18 is constructed of a flexible plastic, molded foam, or a low density rubber material. It must be sufficiently flexible to allow its inner diameter to expand and snugly fit the outer periphery of the faucet 15. Further it must have a density which allows the element to compress into engagement with the annular slot 26 of body 16. It is preferable to construct at least the outer periphery 33 of the sealing element 16 in a cylindrical shape to provide an even distribution of the forces involved.

In many instances it will be desirable to provide a retaining collar 34 which surrounds the body 16 in the area of its engagement with the sealing element 18. The purpose of the collar 34 is to provide further structure to the body 16 to insure reliable retention of the sealing element 18. Collar 34 can be of a variety of configurations such as the flexible pipe clamp element which is releasably secured in place by the mating of the projection 35 in the groove 36 as shown in FIG. 3. Another embodiment of the collar 34 is shown in FIGS. 7 and 8 in the form of a cap 37 which fits over the end 38 of the body 16 and engages annular slot 39 through radially inward projections 40. Axially extending slots 41 formed in the outer surface 42 of the body 16 allows access to the annular slot 39 when the projections 40 are aligned therewith. Rotation of the cap 37 completes its installation and releasably locks cap 37 in place. The upstream face 43 of cap 37 consists of flexible fingers 44 which provides a flexible retaining surface that is readily deformable to fit cover the faucet 15.

Figure 5:
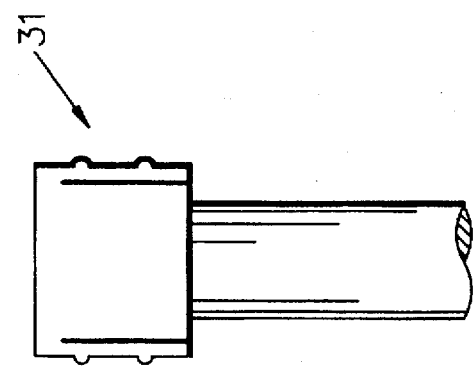
FIG. 5 is front view of the hose connector shown in FIG. 4.

The hose 2 for the bath accessory 3 may be constructed of any convenient design. As shown in FIGS. 4 and 5, a snap fitting 31 is constructed with a cylindrical spring cap 45 having a central bore 46 to receive the hose 2. An external ridge 47 is constructed to engage the groove 28 of the spout 17 when the fitting 31 is installed in the spout 16.

Except as otherwise suggested, the parts of the coupling 19 are constructed of a plastic material suitable for the purpose and are molded using well known techniques. In operation the retaining collar 34 is installed on the faucet 15, followed by the sealing element 18, making sure of a snug fit between the outer surface of faucet 15 and the inner opening of the element 18. Body 16 is placed over the faucet 15 and engaged with the sealing element 18 so that it fills slot 26 and is compressed thereby. Collar 34 can then be moved into place surrounding the body 16 in the area of the sealing element to retain the element in reliable seal with the body 16.

In this manner a universal coupling is provided to adapt a standard bath or sink faucet to accommodate a bath toy or spray head. The coupling of this invention forms a reliable seal and a secure connection under the pressure of flowing water.

I claim:

1. An adapter coupling for connecting the hose of a bath accessory to a faucet, said faucet having a generally horizontally extending body portion and a downwardly opening spout, said coupling comprising:

a generally L-shaped, flexible housing having a cylindrical inlet end, and an outlet end, said inlet end being received over the body portion of the faucet such that the outlet end generally aligns with said spout of said faucet, said cylindrical inlet end having circumferentially continuous cylindrical interior and exterior walls, said interior wall having a diametrical dimension which is substantially greater than the outer dimensions of said body portion of said faucet;

a flexible, disc shaped sealing element received within the inlet end of the housing, said sealing element having an axial opening for receiving the body portion of the faucet therethrough and further having a cylindrical outer peripheral edge which engages with, and presses radially outwardly against, the interior wall of the inlet end of the housing, said sealing element forming a seal between the outer surface of the body portion of the faucet and the interior wall of the inlet end of the housing; and a fixed diameter cylindrical collar which is received around the inlet end of the housing, said collar maintaining a fixed circumference of the inlet end of the housing when water is forced under pressure through said housing.

2. The adapter coupling of claim 1 wherein said collar has a fixed inner diameter which is substantially equal to the outer diameter of the cylindrical inlet end of the housing.

3. The adapter coupling of claim 2 wherein the axial opening of the sealing element is generally quadrilateral in shape.

4. The adapter coupling of claim 1 further comprising means on the interior wall of said inlet end of said housing for retaining the outer peripheral edge of said sealing element in position with the inlet end of said housing.

5. The adapter coupling of claim 4 wherein the axial opening of the sealing element is generally quadrilateral in shape.

6. The adapter coupling of claim 4 wherein said means comprises annular inwardly extending ridges formed on the interior wall.

7. The adapter coupling of claim 6 wherein the axial opening of the sealing element is generally quadrilateral in shape.

8. The adapter coupling of claim 1 wherein the axial opening of the sealing element is generally quadrilateral in shape.

* * * * *